US012581146B2

(12) United States Patent
Riley et al.

(10) Patent No.: US 12,581,146 B2
(45) Date of Patent: Mar. 17, 2026

(54) SYSTEM AND METHOD FOR DYNAMICALLY MODIFYING A TIMELINE RECIPE FOR TARGETED CONTENT DELIVERY

(71) Applicant: Grass Valley Limited, Newbury (GB)

(72) Inventors: Andrew Riley, Kennewick, WA (US); James Wilson, Newbury (GB); James Westland Cain, Newbury (GB); Charles S. Meyer, Crystal Bay, NV (US)

(73) Assignee: GRASS VALLEY LIMITED, College Park, MD (US)

( * ) Notice: Subject to any disclaimer, the term of this patent is extended or adjusted under 35 U.S.C. 154(b) by 187 days.

(21) Appl. No.: 18/345,333

(22) Filed: Jun. 30, 2023

(65) Prior Publication Data

US 2024/0007694 A1 Jan. 4, 2024

Related U.S. Application Data

(60) Provisional application No. 63/357,340, filed on Jun. 30, 2022.

(51) Int. Cl.
| | |
|---|---|
| *H04N 5/445* | (2011.01) |
| *G06F 3/0486* | (2013.01) |
| *H04N 21/258* | (2011.01) |
| *H04N 21/2665* | (2011.01) |

(52) U.S. Cl.
CPC ..... *H04N 21/25883* (2013.01); *G06F 3/0486* (2013.01); *H04N 21/25841* (2013.01); *H04N 21/2665* (2013.01)

(58) Field of Classification Search
CPC ....... H04N 21/25883; H04N 21/25841; H04N 21/2665; H04N 21/252; G06F 3/0486; G06Q 30/0204
USPC .......................................................... 725/44
See application file for complete search history.

(56) References Cited

U.S. PATENT DOCUMENTS

| | | | | |
|---|---|---|---|---|
| 9,451,001 | B2 * | 9/2016 | Hirschfeld ............ | H04L 65/762 |
| 10,609,442 | B2 * | 3/2020 | Hirschfeld ......... | H04N 21/4318 |
| 10,970,843 | B1 * | 4/2021 | Olsen ................. | H04N 21/4316 |
| 2017/0026703 | A1 * | 1/2017 | Phadnis ........... | H04N 21/44226 |

(Continued)

*Primary Examiner* — Sahar Aqil Riaz
(74) *Attorney, Agent, or Firm* — ARENTFOX SCHIFF LLP

(57) ABSTRACT

A system is provided for dynamically modifying a timeline recipe for targeted content delivery. The system includes a content consumption profiler configured to receive viewer profile data relating to a plurality of content consumption devices and to dynamically update a viewer profile database that stores classification parameters for each of the plurality of content consumption devices based on the viewer profile data. The system also includes a user interface generator configured to generate a user interface for dynamically modifying at least one timeline recipe for a targeted content delivery to at least one of the plurality of content consumption devices. Moreover, the system includes a content rendered and delivery manager configured to generate a media content production to be displayed on the respective content consumption devices of targeted grouping based on receiving input via the generated user interface.

17 Claims, 8 Drawing Sheets

100

(56) References Cited

U.S. PATENT DOCUMENTS

2017/0195435 A1* 7/2017 Sarukkai ................. G06F 16/00
2020/0117340 A1* 4/2020 Amitay ................. H04L 67/306

* cited by examiner

100

USER INTERFACE
235A

Group A
305

Group B
310

Recipes
315

Attributes
320

SYSTEM AND METHOD FOR DYNAMICALLY MODIFYING A TIMELINE RECIPE FOR TARGETED CONTENT DELIVERY

CROSS-REFERENCE TO RELATED APPLICATION(S)

This application claims the benefit of U.S. Provisional Application No. 63/357,340 entitled "SYSTEM AND METHOD FOR DYNAMICALLY MODIFYING A TIME-LINE RECIPE FOR TARGETED CONTENT DELIVERY" and filed on Jun. 30, 2022, which is expressly incorporated by reference herein in its entirety.

TECHNICAL FIELD

The system and method disclosed herein is related to media production, and, more particularly, to a system and method for dynamically modifying a timeline recipe for targeted content delivery to one or more client devices.

BACKGROUND

Media production and/or video editing typically involves capturing media content from one or a plurality of live scenes (e.g., a sports venue, news broadcast, video game platforms, and the like), transmitting the captured content to a remote production facility where the video and audio signals are managed by production switchers, graphics effects are added, and the like, and then the processed signals are encoded for transport to a distribution network, such as a television broadcasting network, through one or a plurality of signals. More recently, broadcasting and media production has evolved from analog to digital domain and across various protocols (e.g., MPEG-2 transport streams, Internet Protocol (IP), IPTV, HTTP streaming). In IP technology, there are myriad tools, software code bases, and the like, that present an infinite set of combinations, or development efforts, which lead to a final "product" (e.g., a media production) through execution of media production work-flows that incorporate these tools.

However, even with the infinite set of combinations to deliver the final media production, there is still a disconnect between this production and the individual and particular user. Some systems will attempt to customize content (e.g., targeted advertisements) by managing the experience through audience demographics. However, these demographics still have a level of generality in that they consider blocks, or traditional stereotypes, such as race, gender, age, and zip code. The traditional blocks provide for simple categorization, or selection criteria, yet they may not be optimal.

To provide an even more targeted environment at the individual level, a system is needed that considers audience psychographics, which tend to represent each person as unique. However, the criteria for this optimization needs to be balanced with the criteria for the final content rendition. Accordingly, a technique is needed to enable users to generate customized content productions on the individual level while also balancing the constrains and inputs for the final content production.

SUMMARY OF THE INVENTION

In view of these existing constrains in media production environments, a system and method are provided for dynamically modifying a timeline recipe for targeted content delivery to one or a plurality of content devices to consume the customized content thereon.

More particularly, the system and method provide for a graphical monitor and input controller for optimal configuration and operation of a media production. That is, a graphical user interface is generated for a truly tailored or customized content consuming experience and environment for end users. Generally referred to herein as "tailored TV", the exemplary system and method provide the ability to develop a framework for a show, into which essence is assigned, and controls are enabled.

In a first exemplary embodiment, a user interface is generated having a visualization of blobs (e.g., groups), with each blob being associated with a workflow template and timeline or timeline receipt. In general, a workflow can be considered a graph that defines the deployment for a media production while a timeline defines the timing for the media content production. In this aspect, each blob or grouping can be a set of individuals selected as common, or those individuals who will benefit from the content being served. Using the system and method described herein, each of content as essence, workflow framework, parameters for essence production, and a timeline, can be distributed any-where in the processing path (i.e., the timeline recipe) starting at origin of essence, and ending at consumption by end user client devices, for example. The user interface is effectively a tool that is easily designed for optimizing this process via visualization feedback for a user to dynamically manage a tailored and customized video production.

In one exemplary aspect, the system and method can use a visual indication to set up camera latency where in, rather than having to calculate time stamps and differentials, a visual (or audible) indication provides the equivalent of a radar ping. For a group of devices, a coherent, or single tone, would indicate that all devices are "aligned and within range". Certainly, an intelligent machine is using time stamps to generate this "sound". But for an operator or user of the user interface, the single tone provides a method that is easier than identifying a larger number of waveforms on something akin to a logic analyzer. This aspect is an example of the user interface being used to solve a constrained optimization problem by evoking a human response.

In yet another exemplary aspect, the system and method can be implemented in a virtual reality ("VR") environment that provides a way for the user to become emersed in the complete population, and then choosing certain aspects, attributes of the psychographic set, and providing a visual stimulus, like a heat map, for example. In turn, single attributes can be selected, compared, and as deemed fit, combined, to investigate scenarios quickly, and then chose the best one (optimized recipe) based on the final image composed of the "heat map" signatures they generate.

In view of the foregoing an exemplary embodiment is provided as a system for dynamically modifying a timeline recipe for targeted content delivery. The system includes a media essence database configured to store a plurality of media essence files that each include a sequence of video content and that are each assigned a unique media essence identification; and a content consumption profiler configured to receive viewer profile data relating to a plurality of content consumption devices and to dynamically update a viewer profile database that stores classification parameters for each of the plurality of content consumption devices based on the viewer profile data, with the received viewer profile data including at least geographical location data of viewers of the content consumption devices, viewership history and preferences of the viewers of the content consumption devices, and software and hardware configurations of the content consumption devices.

Moreover, according to the exemplary embodiment, the system for delivering content includes a user interface generator configured to generate a user interface for dynamically modifying at least one timeline recipe for a targeted content delivery to at least one of the plurality of content consumption devices. In this aspect, the user interface is configured to display a heat map to provide a visual representation of a plurality of groupings of the plurality of content consumption devices, with the plurality of groupings based on a selected subset of the stored classification parameters selected by a user of the user interface, display a plurality of timeline recipes that define adjustable instructions for rendering a media production for targeted content delivery to the at least one content consumption device, receive a drag and drop input that drags a selected timeline recipe of the plurality of timeline recipes to a targeted grouping of the plurality of groupings of the plurality of content consumption devices, such that the selected timeline recipe sets the adjustable instructions for the rendering of the media production to the targeted grouping, select a media essence file of the plurality of media essence files for the rendering of the media production by matching the respective unique media essence identification of the selected media essence file to the selected timeline recipe, and modify at least one attribute of the selected media essence file based on a filter selection by the user to modify the selected timeline recipe for the targeted grouping, with the at least one attribute relating to at least one of selected additional content, an audio level of the selected media essence file, and metadata to be displayed in the rendering of the media production and relating to an object displayed in the media essence file. Yet further, the system also includes a content renderer and delivery manager configured to generate a media content production to be displayed on the respective content consumption devices of the targeted grouping, with the generated media content production based on the selected timeline recipe including the modified at least one attribute of the selected media essence file.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
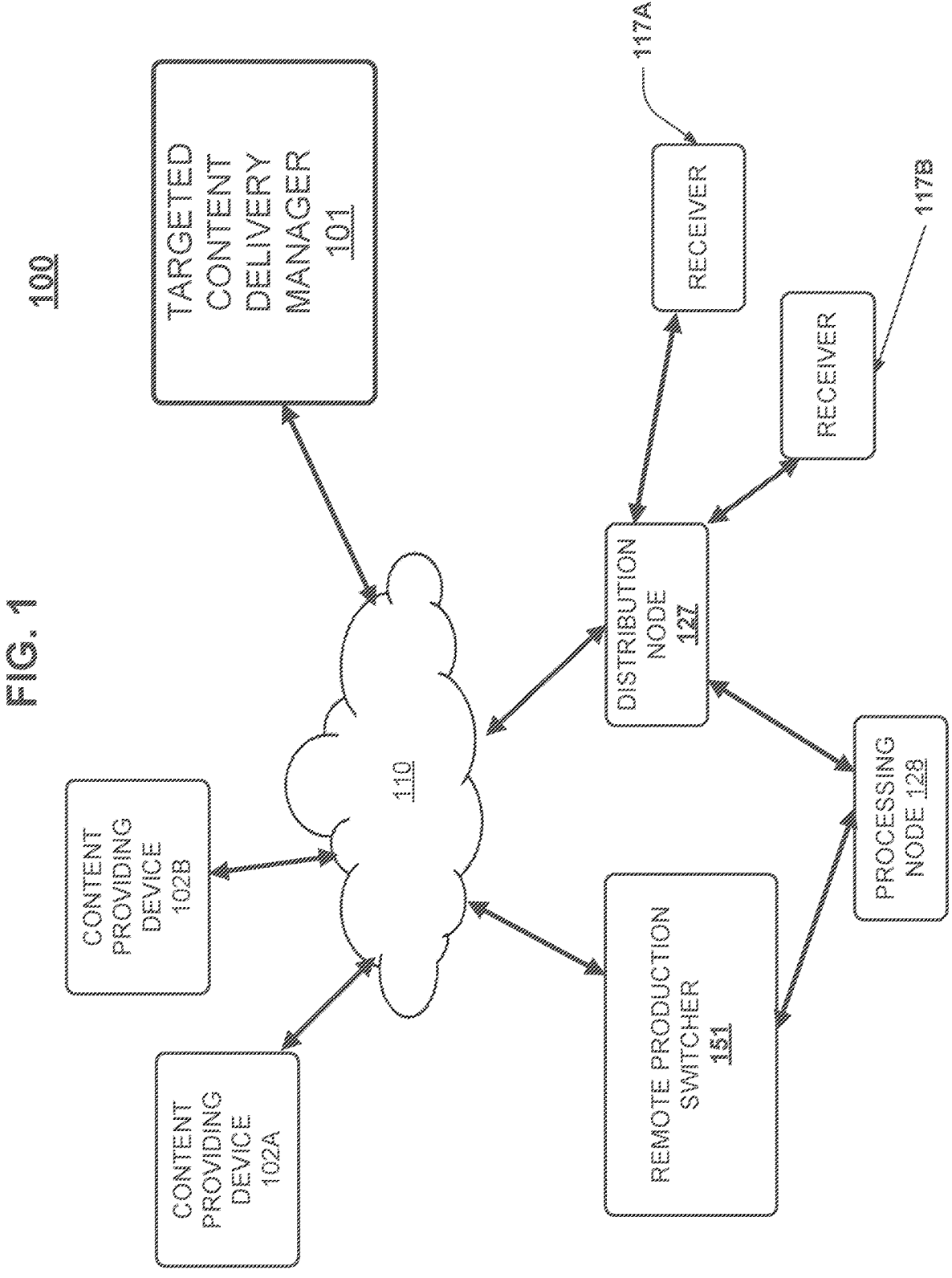
FIG. 1 illustrates a block diagram of a system for dynamically modifying a timeline recipe for targeted content delivery according to an exemplary embodiment.

Various aspects of the invention are now described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

In general, certain aspects of the targeted content delivery system will now be presented with reference to various systems and methods. The systems and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

FIG. 1 illustrates a block diagram of a system for dynamically modifying a timeline recipe for targeted content delivery to a content consumption device according to an exemplary embodiment. As will be described in detail below, the exemplary system 100 includes a targeted content delivery manager 101 that is configured to generate a design interface tool (e.g., a computer-aided design (CAD) software tool and user interface) that enables a user, such as an administrator, to dynamically modify a timeline recipe for tailored content delivery to one or more content delivery devices.

For purposes of this disclosure, media content provided for production according to system 100 is generally referred to as "essence", which denotes media (e.g., a video clip, an audio clip, and/or ancillary data such as captions) that can be consumed by a client consumption device/client device. Moreover, the term "recipe" in the present disclosure denotes a file that includes creative decisions and instructions for rendering a new essence (i.e., a new media content production) from one or more source essences. Recipes reference essences and then add processing instructions to deliver an output. Such references are normally embodied as paths to concrete files of the essence. Thus, the requirement for the essence is indirect via file format parsers built into the tools that can render the recipes. An existing approach to obtain the output of a recipe is to open the recipe in a tool (e.g., Adobe Premiere Pro™) that is compatible with the recipe (e.g., .prproj extension), and then instruct the tool to create a linear essence file containing the output of the render in a format that can be widely read. As will be described in detail herein, the targeted content delivery manager 101 is configured to generate a user interface that enables a user (e.g., an administrator or creator of the tailored media content) to dynamically modify this timeline recipe based on additional parameters and filters, such as user/viewer profile data.

As shown, the system 100 includes the targeted content delivery manager 101, which is the software tool or module (e.g., implemented on one or more computer processing devices) that is configured to dynamically modify the timeline recipe to provide a tailored media content experience according to the algorithms and techniques described herein. Moreover, FIG. 1 illustrate a block diagram of a system that is specific to a media production environment. In an exemplary aspect, the content delivery manager 101 can generally be located remotely from all of the other components in the system and, in some embodiments, coupled to the components (which are part of a cloud computing environment/network) to remotely manage the tailored media production. Thus, the components shown in system 100 are provided as an exemplary system.

Thus, as further shown, system 100 includes a plurality of content providing devices 102A and 102B, which can be configured for an A/V feed across links via the network 110. Moreover, it is noted that while only two devices are shown, the system 100 can be implemented using a single content providing device or many content providing devices. In one exemplary aspect, the plurality of content providing devices 102A and 102B can also include, for example, remote cameras configured to capture live media content, such as the "talent" (e.g., news broadcasters, game commentators, or the like). Moreover, the content providing devices 102A and 102B can include Esports (e.g., electronic sports) real-time content, or the like. In general, it should be appreciated that while the exemplary aspect uses content providing devices 102A and 102B (which may be located at a live event, for example), a similar configuration can be used for any type of content providing device, such as a remote video server (e.g., a media essence repository), for example, that is configured to cache the media content after it is captured and distribute this cached content through the media distribution network.

As further shown, the plurality of content providing devices 102A and 102B can be coupled to a communication network 110, such as the Internet, and/or hardware conducive to internet protocol (IP). That is, system 100 can be comprised of a network of network servers and network devices configured to transmit and receive video and audio signals (e.g., media essence) of various formats. In an exemplary aspect, the communication network 110 and processing components thereof can be executed in a cloud computing environment/network. Moreover, in one aspect, essence, such as video content, that is generated (or otherwise provided) by the content providing devices 102A and 102B is provided as the essence for the tailored media content rendering as described herein.

In general, cloud computing environments or cloud platforms are a virtualization and central management of data center resources configured as software-defined pools. Cloud computing provides the ability to apply abstracted compute, storage, and network resources to the work packages provided on a number of hardware nodes that are clustered together forming the cloud. Moreover, the plurality of nodes each have their specialization, e.g., for running client micro-services, storage, and backup. A management software layer for the application platform offered by the cloud will typically be provided on a hardware node and will include a virtual environment manager component that starts the virtual environments for the platform and can include micro-services and containers, for example. As will be described in detail below, the targeted content delivery manager 101 is configured to access metadata for the plurality of cloud computing resources available for the media production workflow of the media production.

As yet further shown, system 100 can include one or more remote distribution node(s) 127, one or more processing node(s) 128, and one or more remote production switcher(s) 151. As noted above, these components can be implemented as hardware components at various geographical locations or, in the alternative, as processing components as part of the cloud computing environment 101. The one or more distribution nodes 127 (e.g., electronic devices) are configured to distribute the modified media content to one or more distributed nodes (e.g., remote media devices), such as receivers 117A and 117B, which can be content consuming devices (e.g., video editing software on client computing devices, or the like), for example. Moreover, it should be appreciated that while only two receivers 117A and 117B are shown, the network can include any number of content consuming devices configured to receive and consume (e.g., playout) the media content, with such content consuming devices even being distributed across different countries or even different continents. In general, it should be considered that every current computing device can be configured as a player of content. As described in detail below, each user (i.e., viewers or consumers) can be identified for receiving content that is individualized per device. The exemplary system and method described herein provides a graphical user interface that enables a user (e.g., an administrator) to actually see how to use that technology.

In this network, distribution node(s) 127 can further be configured to distribute the media content throughout the distribution network to one or more processing node(s) 128, which may include a mix/effects engine, keyer or the like. Examples of processing node(s) 128 may include remote production switches similar to remote production switcher 151 or remote signal processors and can be included in the cloud computing environment in an exemplary aspect. As described in detail below, processing node 128 (and/or distribution node 127 or remote production switcher 151) can be selected by the targeted content delivery manager 101 to effectively render the tailored media content before it is delivered to APIs of the applications running on receivers 117A and 117B.

Figure 2A:
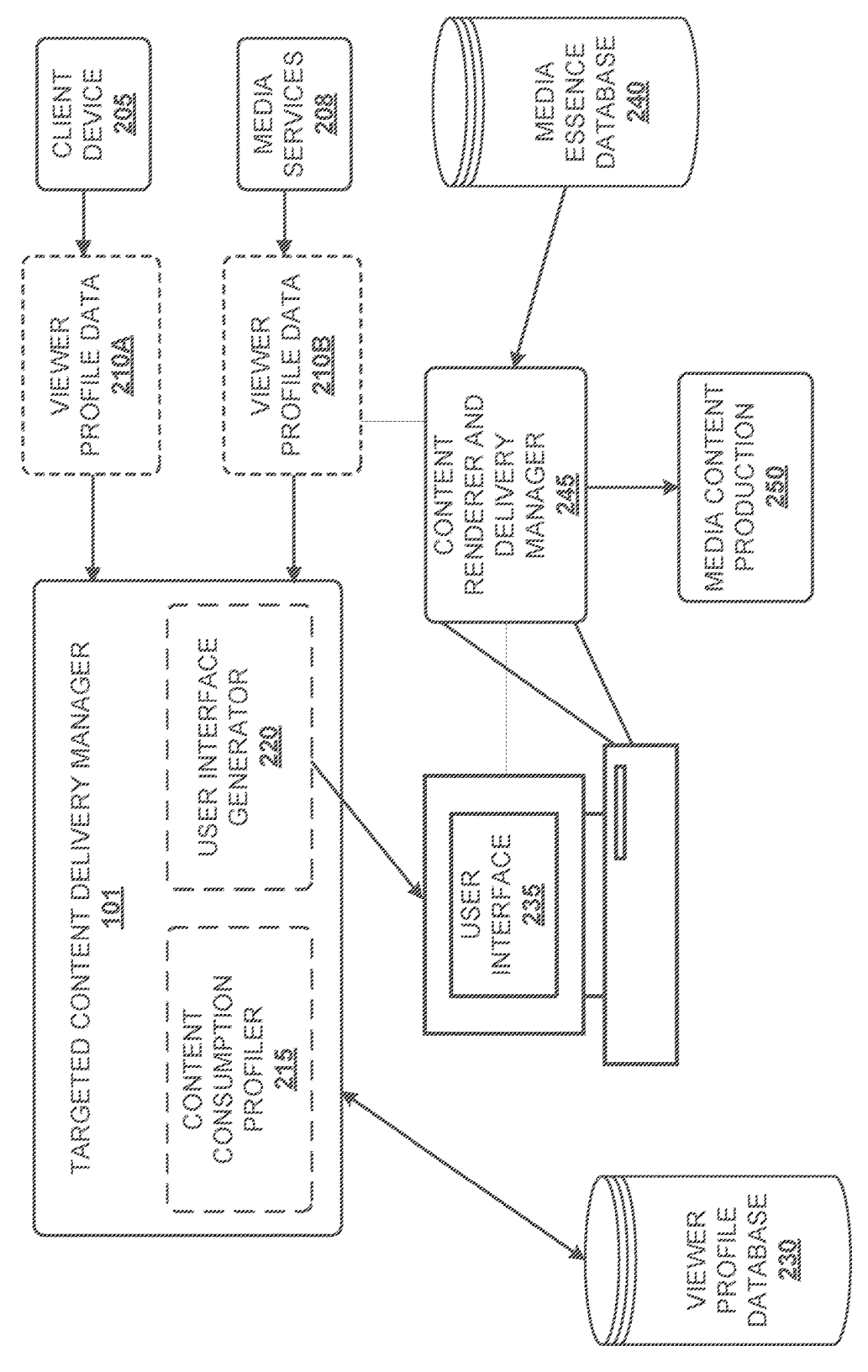
FIGS. 2A and 2B illustrate detailed block diagrams of the targeted content delivery system according to an exemplary embodiment.
Figure 2B:
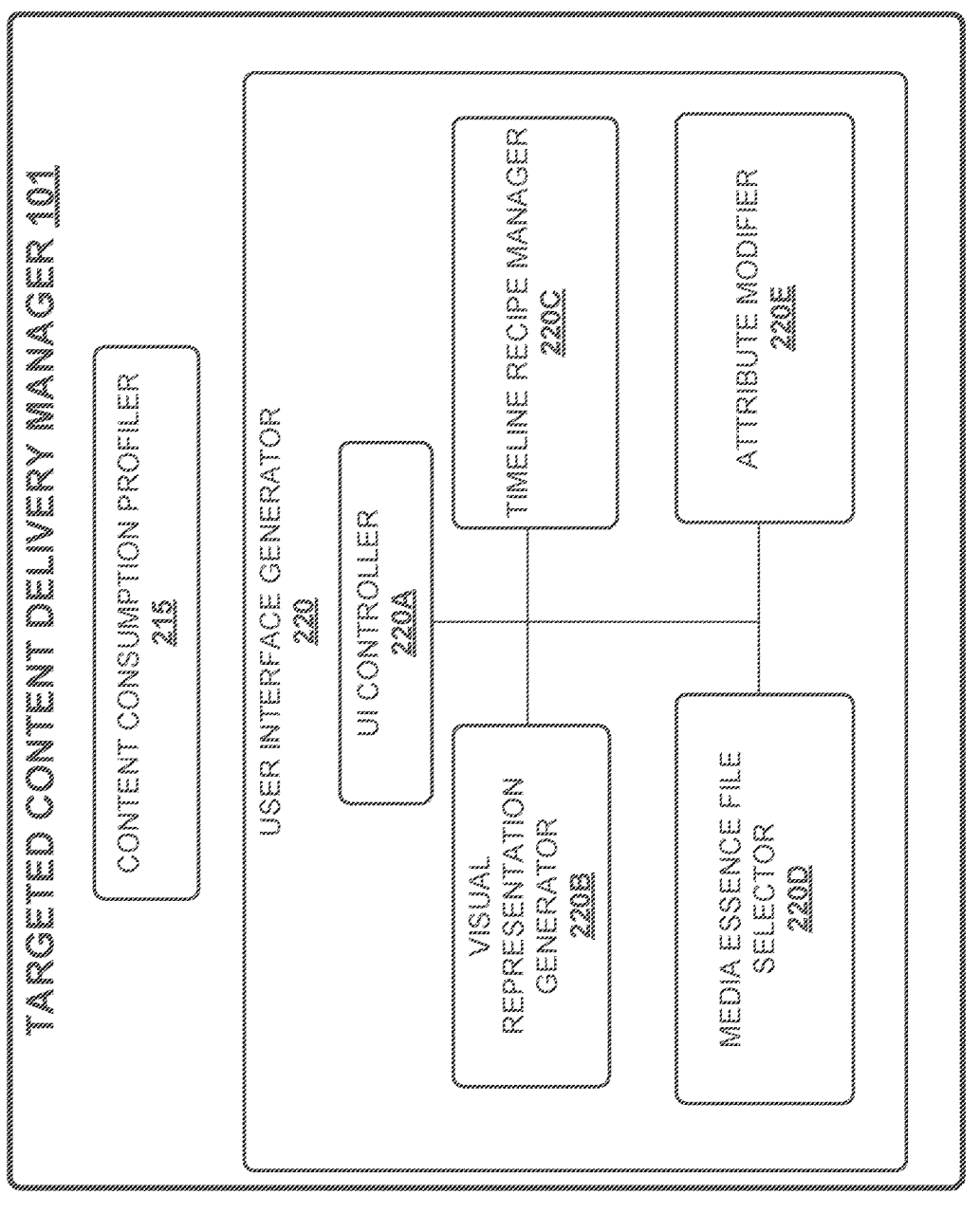

FIGS. 2A and 2B illustrate detailed block diagrams of the targeted content delivery system according to an exemplary embodiment. In particular, FIG. 2A illustrates a more detailed block diagram system 200 that includes the targeted content delivery manager 101 of system 100. That is, system 200 illustrates a more detailed subset of the components of system 100 in an exemplary aspect. FIG. 2B illustrates an exemplary block diagram of the targeted content delivery manager 101.

As described above, the targeted content delivery manager 101 can be implemented on a computer or similar computing device. Moreover, the targeted content delivery manager 101 is coupled to one or more databases, including media essence database 240 and viewer profile database 230. Each of these databases can be co-located with targeted content delivery manager 101 or remotely located, for example, in the cloud.

According to the exemplary aspect, the media essence database 240 is configured to store a plurality of media essence files that each include a sequence of video content and that are each assigned a unique media essence identification. For example, the media essence database 240 can correspond to one or more of content providing devices 102A and/or 102B or the media essence database 240 can receive and store the essence from these content providing devices 102A and/or 102B. Each file of essence can be stored the media essence database 240 and assigned a unique identification or address that enables the targeted content delivery manager 101, or content renderer and delivery manager 245 discussed below, to access the targeted content when rendering the tailored media production.

As further shown, the targeted content delivery manager 101 can include a content consumption profiler 215 that is coupled to viewer profile database 230. According to an exemplary aspect, the content consumption profiler 215 is configured to receive viewer profile data relating to a plurality of content consumption devices and to dynamically update the viewer profile database 230 that stores classification parameters for each of the plurality of content consumption devices based on the viewer profile data. In an exemplary aspect, the targeted content delivery manager 101 is coupled to client device 205 and also to media services 208. Although a single instance of each of client device 205 and media services 208 are shown, it is contemplated that the targeted content delivery manager 101 can be coupled to a plurality (e.g., dozens, hundred or more) of such devices to receive and dynamically build and manage the content consumption profiler 215 and data stored in database 230.

In one aspect, client device 205 can correspond to one or more of receivers 117A and 117B and is configured to receive viewer profile data 210A, which can include, for example, geographical location data of viewers of the content consumption devices 205, as well as software and hardware configurations of the content consumption devices 205. Moreover, media services 208 can correspond to any known type of online content subscription services (e.g., Netflix®, Hulu® any cable broadcasting) or the like that can provide viewership history and preferences of the viewers of the content consumption devices 205. Other sources for profiling users and content devices including the Internet and online content, for example. In general, the content consumption profiler 215 can be configured to collect consumer metrics using other known systems, for example, such as that described in U.S. patent application Ser. No. 16/837, 648, filed Apr. 1, 2020, titled "System and Method for AI Driven Orchestration Automation of Live Production and Channel Playout," the contents of which are hereby incorporated by reference.

As further shown, the targeted content delivery manager 101 further includes, a user interface generator 220 that is configured to generate a user interface 235 for dynamically modifying a timeline recipe for a targeted content delivery to one or more content consumption devices. According to an exemplary aspect, the user interface 235 can be a computing device communicatively coupled to the targeted content delivery manager 101 or can be implemented as part of the targeted content delivery manager 101 in another exemplary aspect.

As further noted above, the user interface 235 can be a design interface tool that is configured to dynamically modify a timeline recipe for tailored content delivery to one or more content delivery devices. Using the exemplary user interface 235, a user, such as an administrator or director of the media content, can be configured to dynamically manage the timeline in order to tailor or customize the media content. As noted above, the recipe can refer to actual media essence, such as that essence stored in media essence database 240.

In turn, a content renderer and delivery manager 245 is configured to generate the tailored media content production 250 that can then be transmitted to end user devices. More particularly, the content renderer and delivery manager 245 is configured to generate a media content production 250 based on a dynamically managed timeline recipe with the content production 250 configured to be displayed on the respective content consumption devices of a targeted grouping (i.e., it is tailored or customized). That is, the generated media content production 245 is based on the selected timeline recipe including one or more modified attributes of the selected media essence file from media essence database 240. It should be appreciated that the term "grouping" refers to one or more content consumption devices (e.g., client devices) that can receive and consume the tailored content by viewing the content, for example.

FIG. 2B illustrates a detailed block diagram of the targeted content delivery manager 101 according to an exemplary embodiment. It should again be appreciated that FIG. 2B illustrates the targeted content delivery manager 101 that interacts with the components of FIGS. 1 and 2A as described above. As described above, the targeted content delivery manager 101 can be implemented on one or more computing devices that is communicatively coupled to the network 110 for media content production as shown above. Moreover, the targeted content delivery manager 101 includes a plurality of components and/or modules for executing the algorithms and techniques described herein.

More specifically, the targeted content delivery manager 101 includes the content consumption profiler 215 and the user interface generator 220, as described above. In addition, the user interface generator 220 can include a plurality of sub-components, including UI controller 220A, heat map generator 220B, timeline recipe manager 220C, media essence file selector 220D and attribute modifier 220E. In an exemplary aspect, each of these components can be implemented as software engines or modules configured for executing the algorithms disclosed herein.

In general, UI controller 220A can be a processor configured to execute instructions for implementing each of the modules of the heat map generator 220B, timeline recipe manager 220C, media essence file selector 220D and attribute modifier 220E. The term "module" as used herein can refer to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

As shown in the exemplary aspect, the user interface generator 220 includes a heat map generator 220B that is configured to display a heat map to provide a visual representation of a plurality of groupings of the plurality of content consumption devices. In this aspect, the content consumption profiler 215 is configured to access the viewer profile database 230 to access such profile data. In turn, plurality of groupings displayed in the heat map on the user interface 235 can be based on a selected subset of the stored classification parameters selected by a user of the user interface 235. That is, the user interface 235 can include a drop list or otherwise selectable list of parameters, such as geographic location, age group, content preferences, device configurations (software and hardware) and any other parameters that can be used to group or categorize groups of end consumers and/or content consumption devices.

As such, the user (e.g., administrator) of the user interface 235 can select a subset of these selectable parameters. In turn, the content consumption profiler 215 can access the viewer profile database 230 to access identifications of the viewers and/or devices matching these selectable parameters. Upon receiving this data, the heat map generator 220B is configured to display a heat map that illustrates groupings or blobs of these identified viewers and/or devices. Although a heat map is one data visualization technique showing the magnitudes of these users in color and in two dimensions, it should be appreciate that the user interface 235 can display the grouping or blobs of the selected characteristics and parameters using other visualization techniques, such as Venn diagrams or similar techniques.

In an alternative aspect, the user interface 235 can be implemented in a virtual reality ("VR") environment that enables the user to become emersed in the complete population, and then choose certain aspects, attributes of the psychographic set, and providing a visual stimulus, like a heat map, for example, as described in detail below. In turn, single attributes can be selected, compared, and as deemed fit, combined, to investigate scenarios quickly, and then chose the best one (optimized recipe) based on the final image composed of the "heat map" signatures they generate.

In addition, the user interface generator 220 further includes a timeline recipe manager 220C that is configured to display a plurality of timeline recipes that define adjustable instructions for rendering a media production for targeted content delivery to content consumption devices. In one aspect, timeline recipes can be predefined templates that allow the user (e.g. administrator) to select one of these recipes as a building block for the targeted or tailored content delivery. That is, the recipe can be a file that includes creative decisions and instructions for rendering the new and tailored essence production from one or more source essences, such as those selected from media essence database 240 as described above.

Using the user interface 235, a user can enter control instructions to dynamically modify the timeline receipt. In an exemplary aspect, a user can execute a drag and drop input that drags a selected timeline recipe of the plurality of timeline recipes to a targeted grouping of the plurality of groupings of the plurality of content consumption devices. In other words, based on the heat map of profile data, there can be preset groupings or the user can define groupings based on the colors of the heat map, for example. By selecting this grouping, a user can then select a predefined template of a selected timeline recipe and drag it to the grouping to begin the generating of the customized or tailored content production for that selected group. In the exemplary aspect, the selected timeline recipe sets adjustable instructions for the rendering of the media production to the targeted grouping.

To further build the tailored media content, the user interface generator 220 includes media essence file selector 220D that is configured to enable a user to select a media essence file of the plurality of media essence files from the media essence database 240 as described above. That is, the user may know based on the selected parameters of the profile data as described above what type of content to deliver to the selected grouping. The user can then in turn access the media essence database 240 to select one or more essence files based on the unique identification information. In other words, the essence files for the rendering of the media production can be selected by matching the respective unique media essence identification of the selected media essence file to the selected timeline recipe. In one aspect, the media essence file selector 220D is configured to embed one or more paths in the recipe to concrete files of the essence by selecting of the desired content from the database 240.

In alternative aspect, the media essence itself may be preselected as part of a templated recipe. In other words, prior to media production, the essence can be preset files of a live event, such as a live sporting event that are preconfigured to a recipe with the content being added not the media essence database 240 as it is captured. The user can then select this predefined timeline recipe with the associated live content and drag it to the selected group as discussed above.

In either event, the user interface generator 220 can also include an attribute modifier 220E that is configured to modify one or more one attributes (or filters) of the selected media essence file based on a filter selection by the user to modify the selected timeline recipe for the targeted grouping. The additional modification of these attributes creates a fully tailored experience for the end consumers. In exemplary aspects, these attribute can relate to one or more of selected additional content (e.g., advertisements, metadata, such as sports statistics or the like), an audio level of the selected media essence file, and metadata to be displayed in the rendering of the media production and relating to an object displayed in the media essence file. For example, in one aspect, the user can select separate video files (e.g., sports highlights) or images to be included (e.g., overlaid on the essence) according to the timeline recipe. Thus, the selected media essence file can be a part of a live video production, but the user can also select "on the fly" (i.e., dynamically or in real-time) additional videos to be presented during a commercial break or the like.

In an exemplary aspect, the media essence database 240 can be composed of a media essence repository that is configured to store a plurality of media assets, such as sequences of video and audio content, where the media essence repository can be a video server, for example, and/or can correspond to one or more of content providing devices 102A and 102B as described above with respect to FIG. 1. The media essence file selector 220D of the targeted content delivery manager 101 can further include a media essence access database, which can be a standalone database communicatively coupled to targeted content delivery manager 101 in one exemplary aspect. Here, the media essence access database is configured to store access metadata that indicates access information (e.g., media location metadata) for identifying each of the plurality of media assets in the media essence database 240, including, for example, a track number and range of each of the plurality of media asset selected by the user interface 235 to be included in media content production 250. That is, the user of user interface 2350 can dynamically specify the requested media content which can be accessed by the targeted content delivery manager 101 (or content renderer and delivery manager 245, which can be a component or module of the targeted content delivery manager 101) using the media access database which uses media request information to lookup up the location of the media in the media essence database 240. In one aspect, this request can be made by an API of the client application on a client device, as described in U.S. patent application Ser. No. 16/569,323, filed Sep. 12, 2019, and titled "System and Method for Dynamically Accessing Media Assets", the entire contents of which are hereby incorporated by reference.

In an exemplary aspect, the content renderer and delivery manager 245 can be configured to access the dynamically updated timeline recipe from the user interface 235 (and/or the targeted content delivery manager 101). Moreover, the timeline recipe enables the content renderer and delivery manager 245 to look up and determine which essence to access and which attributes to be applied. The content renderer and delivery manager 245 can then be configured to execute a workflow of the media production based on the defined timeline recipe to generate the tailored media production that can then be distributed to the selected grouping of users and/or content consuming devices.

To do so and in one exemplary aspect, the content renderer and delivery manager 245 can also be configured to assign a unique identification to each of the plurality attributes (e.g., additional content and/or content manipulation functions). Using these unique identifications, the content renderer and delivery manager 245 can identify the additional content or production components (switchers, GPUs, or the like) to generate the tailored content that is specified for the grouping of targeted views and/or content consuming devices.

Figure 3A:
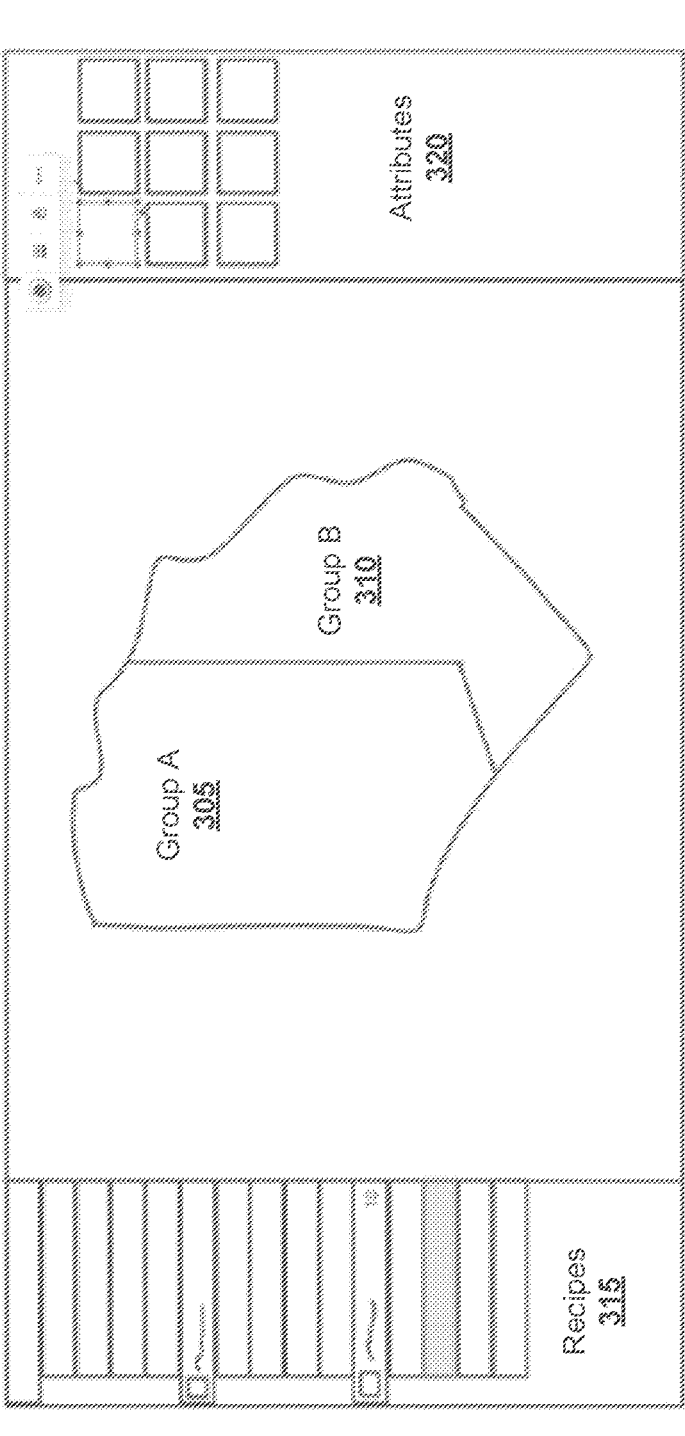
FIGS. 3A to 3C illustrate exemplary user interfaces for targeted content delivery system according to an exemplary embodiment.
Figure 3B:
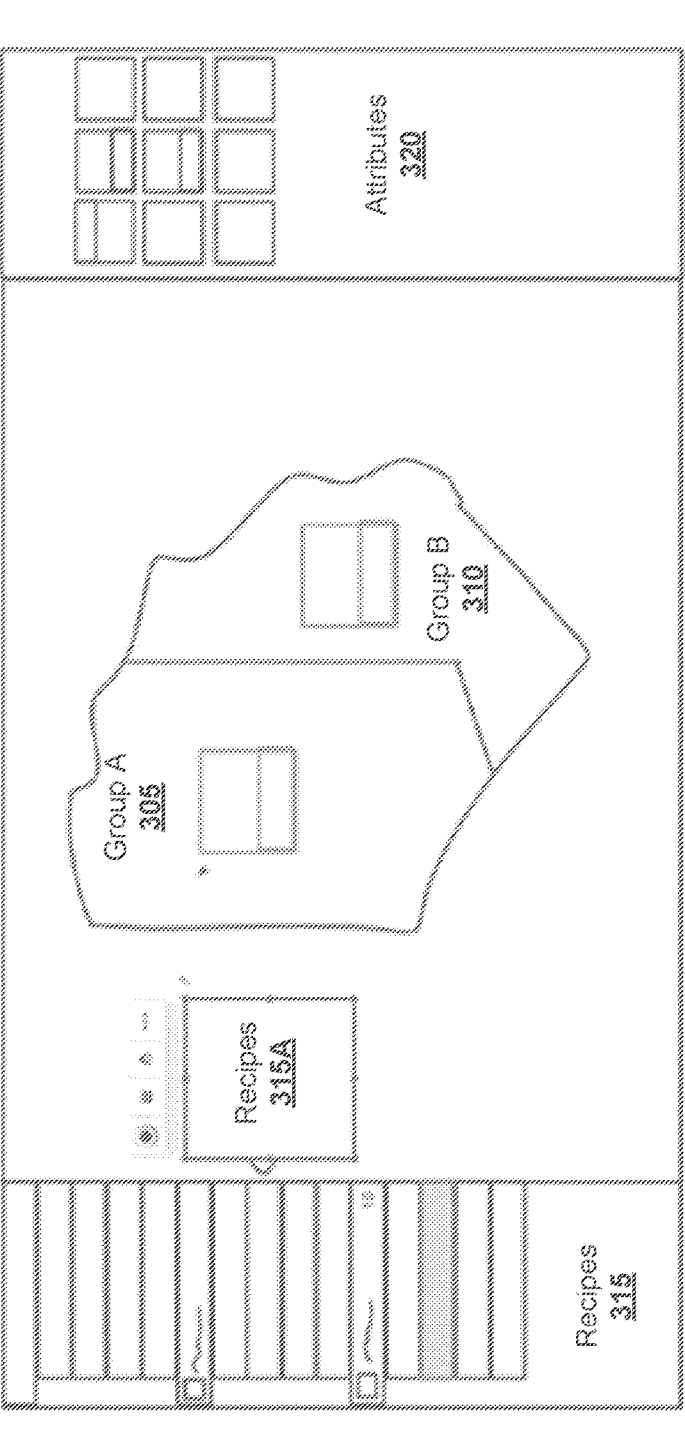
Figure 3C:
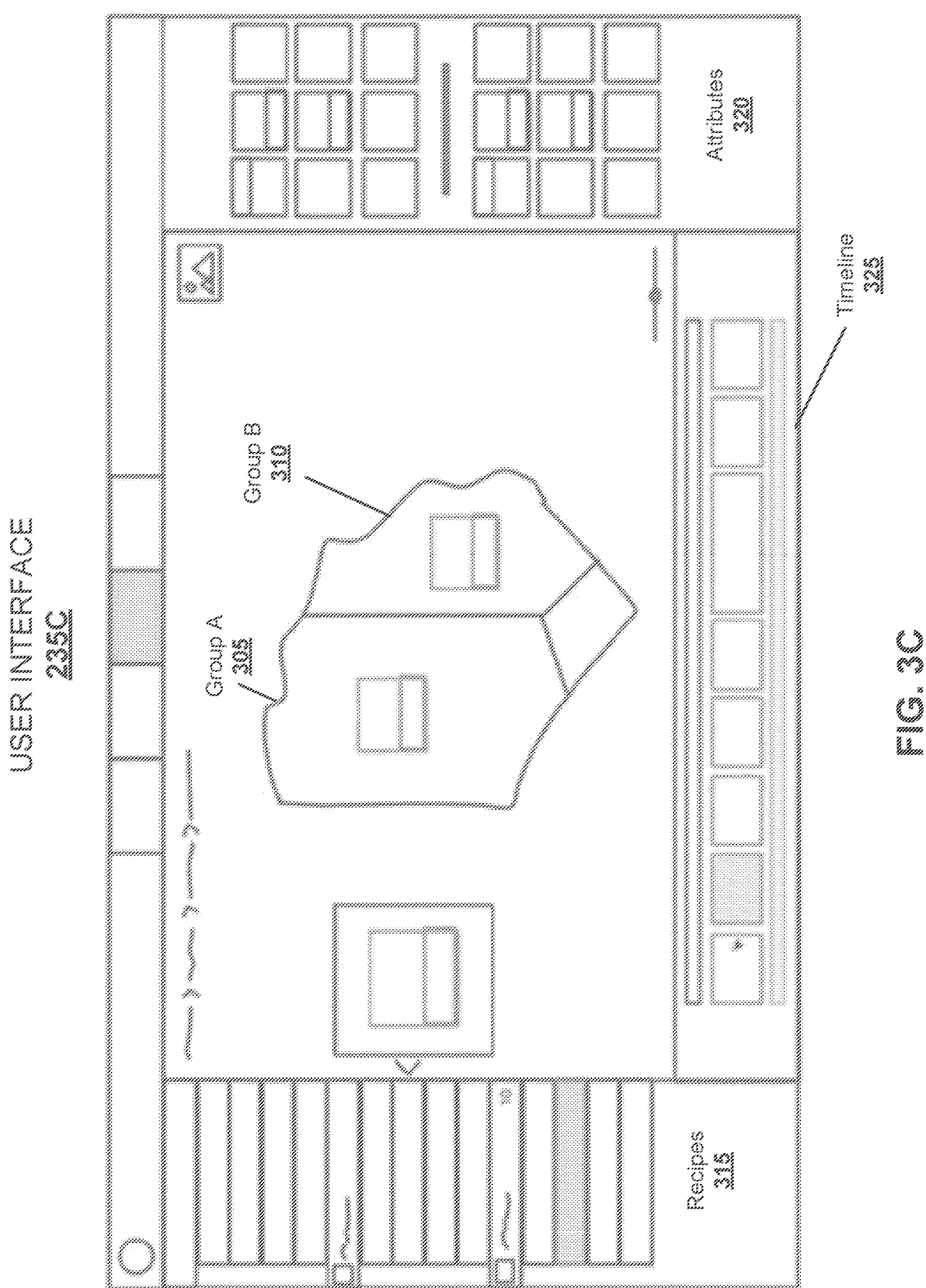

FIGS. 3A to 3C illustrate exemplary iterations of the user interface for targeted content delivery system according to an exemplary embodiment. In particular, FIG. 3A illustrates a first iteration of the user interface 235A in which a heat map of a plurality of groupings (e.g., group A 305 and group B 310) is generated as described above. While only two groupings are shown, it should be appreciated that the heat map (or similar visualization technique) can generate any number of groupings according to the selected characteristics of the profiled users as described above.

In addition, a plurality of recipes 315 or other filters may be displayed on the left of the user interface. This window (or pane) enables a user to select the different recipes or different filters of a recipe and allows the user to simply drag and drop the selected user to a desired grouping. For example, as shown in FIG. 3A, in the iteration of the user interface 235B, a user is selecting and dragging a desired recipe 315A to either of group A 305 and/or group B 310 (both groups are shown to have the recipe in this aspect). Moreover, preset attributes 320 (or filters) are displayed in the window on the right of the user interface. In an exemplary aspect, the preset attributes 320 in the right hand list can be dragged onto one of the blobs in the central section, which enables a "tailoring" (or customization) of how those viewers see the content. For example, one of the right hand icons can mean add lower thirds for overlays, and another icon might not offer overlays, while a third icon might offer them to the side.

As further shown in interface 235C of FIG. 3C, a user can then dynamically modify a timeline recipe 325. For example, the user can just drag and drop a filtered list to either of the one or more desired zones (or blobs or groupings) and then only just edit what is in that timeline when is then shown as timeline recipe 325. Effectively, the user can manipulate these different windows or panes to dynamically adjust the timeline recipe as described herein. In one aspect, the user interface 235C can allow the user to modify the selected attributes (or filters) applied to the timeline recipe 325, such as shuffling clips, adjusting audio levels, selecting different effects from the right side attributes 320 that the user is selected to send to each region or each group for the tailored media content.

Effectively, the user interface 235 enables a user (e.g., a content manager or administrator) to group viewers according to different user profile metrics (e.g., by a heat map) and then decide which predefined (and adjustable) recipe to send to each selected group. In other words, the system and method enable a user to make a connect between a group and profile and then customize the content production accordingly and dynamically. Effectively, the user interface 235 enables the user being the creative to make the tailored video production, with the viewer being the person who's on the end of receiving the recipe that renders on that device being used to consume the content. Once the group is selected, preset filters or attributes 320 can be selected and applied to the recipe for production. For example, the user can select a screen overlay (e.g., a logo or actionable button) on the video content.

Moreover, the viewer profile database 230 dynamically grows and morphs over time based on the received viewer profile data 210A and 210B as described above with respect to FIG. 2A. This enables the heat map generator 220B to perform a data mining of the profile data when generating the heat map. Effectively, every content user can be profiled based on the different metrics to help build predictable and specific groupings. This profiling can include all of the metrics gathered from a user and/or content consuming device, including computing devices, televisions, etc., that each have browsers and can store cookies used to gather the profile metrics and metadata. Effectively, the viewer profile database 230 can be configured to determine which each end user is watching based on the cookie that travel back and forth every time the end user is consuming content. Related parameters include how many hours or minutes or seconds the end consumer is watching content and when the turned it off, when they paused it, when they came on and they skipped ahead, and the like, all of which can be stored as profile data. In turn, this profile data can be the basis of selectable parameters to help build the heat map or other user profile visualization techniques as described above.

In yet one exemplary aspect, the system and method described herein can create tailored content on the individual level. For example, the administrator may be selecting pretty much the same content for thousands of people for a selected group, but then individual recipes can be applied meaning mean the combination of viewership is completely unique to each individual if desired. For example, only some viewers need audio description for the partially sighted, while other viewers may not want a music background track or crowd noise as they are hard of hearing. Moreover, knowing the specific hardware and software configurations enables the administrator to select the specific type of text for the video that can be rendered on the phone or the device viewing the content. In other words, the selected recipe can be configured by the user interface to pull feeds from live and pre-made CDN content to each device to be rendered thereon. Effectively, the system and method can be configured to scale out, but is not bound to the limits of a data center egress.

Yet further, the targeted content delivery manager 101 of the exemplary system and method can be configured to execute in a "live" mode where the essence being distributed is live video content. In this aspect, the media essence database 240 (or a remotely located database) could include metadata relating to the live content (e.g., a soccer game between Liverpool and Manchester City) with the metadata being preselected for this match and related to particular players, referees, weather and the like. When an event happens in the live content, the system can be configured to use AI attributes relating to the goal (e.g., distance, location of the goal, player, goalie, etc.), such that similar examples of goals with the same arc or the same player positioning can be identified. For example, there are a number of algorithms that can be implemented to bear in this context, such as object tracking or the like. In general, the AI is using a multitude of measurements (e.g., including object tracking and the like) to look for similarities in the content. More particularly, the user interface 235 could have an additional tab of archived content that can be selected and dragged to the dynamically adjusting timeline recipe, which again is targeted to a selected group of one or more content consumers as described above. Effectively, a fully tailored and customized media production can be dynamically managed and developed in a live or real-time environment.

In yet an additional exemplary aspect, the user interface 235 could be generated on the end content consuming device, such as client device 205. In one exemplary aspect, the user interface 235 on the content consuming device potentially has all the capabilities previously described. In this aspect, an administrator working from home can be positioned in the same context as a content consumer with the same hardware and internet connection, no distinction in possible user actions, other than limits imposed by software permissions. That is, the viewer of client device 205 can be configured as the user or administrator and thus the producer of his or her own content or even their own customized content for additional viewers. This user interface could expose the controls, knobs, etc., of the user interface or a portion thereof to interact with the targeted content delivery manager 101 using the algorithms described herein. In other words, the targeted content delivery manager 101 can be implemented as a distributed system in which certain limited functions are presented to the end consumer (e.g., essence selection and preset filters), where other functions are only available to the user, such as the heat map visualizations described above. In one aspect, the user on the client device may be presented with a user interface 235 that only exposes the timeline recipe 325 and attributes 320, but hides the recipes and heat map. The user can then drag and drop the desired filters to the timeline to create an individualized viewing experience using the algorithms and features otherwise described above.

Thus, in an exemplary aspect, the client device 205 is located remotely from and connected to network 110 and can correspond either of receivers 117A and/or 117B in an exemplary aspect. Moreover, client device 205 can be executing, for example, a host application, such as a video editing software that can be configured to load a user interface similar to user interface 235 as described above. In this aspect, the host application can include a content API that is configured to transmit a request to features provided by the targeted content delivery manager 101. Based on the request, the targeted content delivery manager 101 can be configured to deliver a software application for the user interface to be loaded thereon and otherwise dynamically manage the timeline recipe as described above. As the media essence is pulled from media essence database 240, it is decompressed (e.g., in a plugin of the targeted content delivery manager 101) where it is then offered to the content API of the content consuming device only after the selected filters and attributes are applied according to the specific customization of the user interface executed on the client device 205.

In an exemplary aspect, in the cloud, the content renderer and delivery manager 245 can also be configured to select a CPU, a GPU or an FPGA, or a combination thereof, for a selected function or filter for the requested media asset(s) and can do so using various techniques as would be appreciated to one skilled in the art. For example, in one aspect, IAC and CAC enables porting (or "lift and shift") that effectively migrates the selected media manipulation function to the cloud platform (which includes the media production processing components described above). In turn, the cloud computing platform can receive the request and dynamically modify the configurations for performing the selected function in response to the request. In an alternative aspect, the selected media manipulation function can be configured as one or more containers within the cloud platform, such that a new container is generated for each selected function specified by the dynamically controlled timeline recipe. This new container can then be provided to the cloud platform 110.

Figure 4:
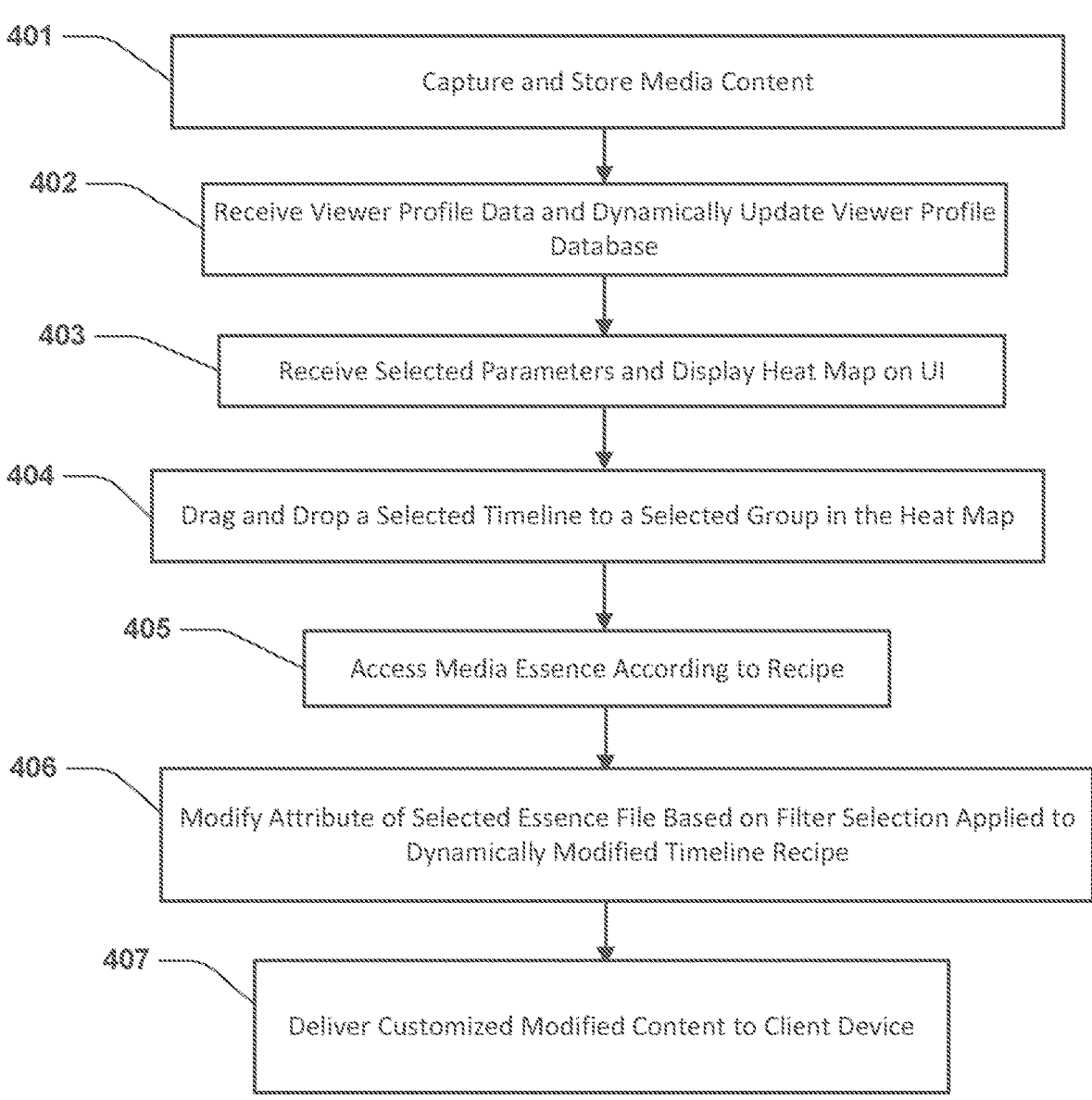
FIG. 4 illustrates a flowchart for a method for dynamically modifying a timeline recipe for targeted content delivery according to an exemplary embodiment.

FIG. 4 illustrates a flowchart for a method for dynamically modifying a timeline recipe for targeted content delivery according to an exemplary embodiment. In general, it should be appreciated that the method 400 can be executed using one or more of the components described above with respect to FIGS. 1-3. Moreover, the method 400 will be described in general terms of the targeted content delivery manager 101 and generated user interface, but it should be appreciated that the steps of the described method can be executed using one or more of the specific modules of the targeted content delivery manager 101 as described above.

As shown, the method begins at Step 401 when media essence is captured, for example, at a live event and stored in a media essence. Moreover, the plurality of media essence files stored therein that each include a sequence of the captured video content and each file is assigned a unique media essence identification. Step 402 can be performed in parallel or in sequence. In particular, the content consumption profiler continuously receives viewer profile data relating to a plurality of content consumption devices and dynamically updates the viewer profile database that stores classification parameters for each of the plurality of content consumption devices based on the viewer profile data. As described above, the viewer profile data can include, for example, geographical location data of viewers of the content consumption devices, viewership history and preferences of the viewers of the content consumption devices, and software and hardware configurations of the content consumption devices.

Starting at Step 403, a user interface is generated and operated to produce the tailored media content. In particular, the user interface generator generates a user interface for dynamically modifying at least one timeline recipe for a targeted content delivery to at least one of the plurality of content consumption devices. At Step 403, parameters are selected by a user for the profiling which then displays a heat map to provide a visual representation of a plurality of groupings of the plurality of content consumption devices. As described above, the plurality of groupings are based on a selected subset of the stored classification parameters selected by a user of the user interface.

At Step 404, a plurality of timeline recipes are displayed that define adjustable instructions for rendering a media production for targeted content delivery to the at least one content consumption device. In this aspect, the user interface 235 receives a drag and drop input that drags a selected timeline recipe of the plurality of timeline recipes to a targeted grouping of the plurality of groupings of the plurality of content consumption devices. That the selected timeline recipe is configured to set the adjustable instructions for the rendering of the media production to the targeted grouping. In turn, at Step 405, the user and/or the recipe selects a media essence file of the plurality of media essence files for the rendering of the media production by matching the respective unique media essence identification of the selected media essence file to the selected timeline recipe.

Next, at Step 406, the user interface modifies at least one attribute or filter of the selected media essence file based on a filter selection by the user to modify the selected timeline recipe for the targeted grouping. In exemplary aspects, the one or more attribute or filters can relate to at least one of selected additional content, an audio level of the selected media essence file, and metadata to be displayed in the rendering of the media production and relating to an object displayed in the media essence file. Finally, at Step 407, the method performs the generatings, by the content renderer and delivery manager, of the media content production to be displayed on the respective content consumption devices of the targeted grouping, with the generated media content production tailored and customized based on the selected timeline recipe including the modified at least one attribute of the selected media essence file. Advantageously, the method 400 provides a truly customized media production that matches profiled viewers to selected content in an easily and manageable way with user interface 235.

Figure 5:
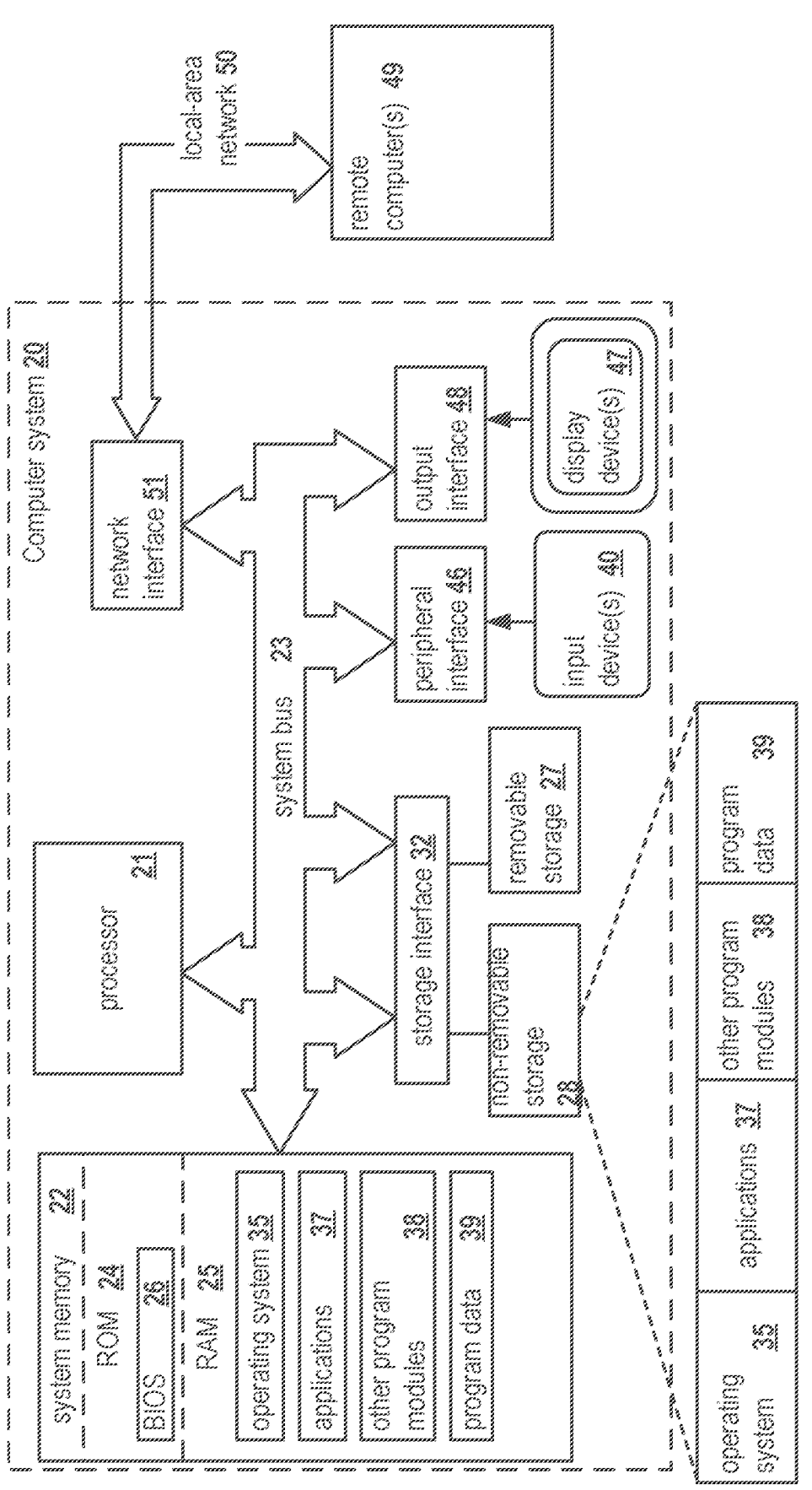
FIG. 5 is a block diagram illustrating a computer system on which aspects of systems and methods for dynamically modifying a timeline recipe for targeted content delivery according to an exemplary embodiment.

FIG. 5 is a block diagram illustrating a computer system on which aspects of systems and methods for dynamically modifying a timeline recipe for targeted content delivery according to an exemplary embodiment. It should be noted that the computer system 20 can correspond to the system 100 or any components therein, including, for example, targeted content delivery manager 101. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20. These storage devices can correspond to databases 230 and 240, for example The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In one aspect, the user interface 235 can be executed and presented on display device 47, for example. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces. In an exemplary aspect, the one or more remote computers 49 can correspond to the cloud computing network 110, as well as one or more of the various components shown in FIGS. 1-3 as described above.

In general, exemplary aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A system for dynamically modifying a timeline recipe for targeted content delivery, the system comprising:
   a media essence database configured to store a plurality of media essence files that each include a sequence of video content and that are each assigned a unique media essence identification;
   a content consumption profiler configured to receive viewer profile data relating to a plurality of content consumption devices and to dynamically update a viewer profile database that stores classification parameters for each of the plurality of content consumption devices based on the viewer profile data, with the received viewer profile data including at least geographical location data of viewers of the content consumption devices, viewership history and preferences of the viewers of the content consumption devices, and software and hardware configurations of the content consumption devices;
   a user interface generator configured to generate a user interface for dynamically modifying at least one timeline recipe for a targeted content delivery to at least one of the plurality of content consumption devices, with the user interface being configured to:

display a heat map to provide a visual representation of a plurality of groupings of the plurality of content consumption devices, with the plurality of groupings based on a selected subset of the stored classification parameters selected by a user of the user interface, display a plurality of timeline recipes that define adjustable instructions for rendering a media production for targeted content delivery to the at least one content consumption device, receive a drag and drop input that drags a selected timeline recipe of the plurality of timeline recipes to a targeted grouping of the plurality of groupings of the plurality of content consumption devices, such that the selected timeline recipe sets the adjustable instructions for the rendering of the media production to the targeted grouping, select a media essence file of the plurality of media essence files for the rendering of the media production by matching the respective unique media essence identification of the selected media essence file to the selected timeline recipe, and modify at least one attribute of the selected media essence file based on a filter selection by the user to modify the selected timeline recipe for the targeted grouping, with the at least one attribute relating to at least one of selected additional content, an audio level of the selected media essence file, and metadata to be displayed in the rendering of the media production and relating to an object displayed in the media essence file; and a content renderer and delivery manager configured to generate a media content production to be displayed on the respective content consumption devices of the targeted grouping, with the generated media content production based on the selected timeline recipe including the modified at least one attribute of the selected media essence file.

2. The system of claim 1, wherein the media essence file comprises a video clip, an audio clip, or ancillary data to be consumed by content consumption devices.

3. The system of claim 1, wherein the content consumption profiler and the user interface generator are executed in a cloud computing network.

4. The system of claim 1, wherein the user interface is implemented in a virtual reality environment.

5. A system for dynamically modifying a timeline recipe for targeted content delivery, the system comprising:

a content consumption profiler configured to receive viewer profile data relating to a plurality of content consumption devices and to dynamically update a viewer profile database that stores classification parameters for each of the plurality of content consumption devices based on the viewer profile data;

a user interface generator configured to:

generate a user interface for dynamically modifying at least one timeline recipe for a targeted content delivery to at least one of the plurality of content consumption devices;

display a heat map to provide a visual representation of a plurality of groupings of the plurality of content consumption devices, wherein the plurality of groupings is based on a selected subset of the stored classification parameters selected by a user of the user interface;

display a plurality of timeline recipes that define adjustable instructions for rendering a media production for targeted content delivery to the at least one content consumption device;

receive a drag and drop input that drags a selected timeline recipe of the plurality of timeline recipes to a targeted grouping of the plurality of groupings of the plurality of content consumption devices, such that the selected timeline recipe sets the adjustable instructions for the rendering of the media production to the targeted grouping;

select a media essence file of the plurality of media essence files for the rendering of the media production by matching a respective unique media essence identification of the selected media essence file to the selected timeline recipe, wherein the plurality of media essence files each include a sequence of video content and that are each assigned a unique media essence identification; and modify at least one attribute or filter of the selected media essence file based on a filter selection by the user to modify the selected timeline recipe for the targeted grouping, wherein the generated media content production is based on selection of a timeline recipe including modifying at least one attribute of the selected media essence file; and a content rendered and delivery manager configured to generate a media content production to be displayed on the respective content consumption devices of targeted grouping based on receiving input via the generated user interface.

6. The system of claim 5, wherein the received viewer profile data comprises at least one of geographical location data of viewers of the content consumption devices, viewership history of the viewers of the content consumption devices, preferences of the viewers of the content consumption devices, software configurations of the content consumption devices, or hardware configurations of the content consumption devices.

7. The system of claim 5, wherein the at least one attribute or filter relating to at least one of selected additional content, an audio level of the selected media essence file, and metadata to be displayed in the rendering of the media production and relating to an object displayed in the media essence file.

8. The system of claim 5, wherein the media essence file comprises a video clip, an audio clip, or ancillary data to be consumed by content consumption devices.

9. The system of claim 5, wherein the content consumption profiler and the user interface generator are executed in a cloud computing network.

10. The system of claim 5, wherein the user interface is implemented in a virtual reality environment.

11. A method for generating a user interface for dynamically modifying a timeline recipe for targeted content delivery, the method comprising:

receiving viewer profile data relating to a plurality of content consumption devices and to dynamically update a viewer profile database that stores classification parameters for each of the plurality of content consumption devices based on the viewer profile data;

generating a user interface, wherein the user interface is configured to:

display, on a first portion of the user interface, a heat map comprising a plurality of groupings of content consumption devices, display, on a second portion of the user interface, a plurality of timeline recipes that define adjustable instructions for rendering a media production for targeted content delivery to at least one content consumption device, and display, on a third portion of the user interface, graphical user interface elements representing present attributes or filters, wherein the graphical user interface elements may be dragged into a group among the plurality of groupings in the heat map to customize how a user sees content;

receiving an input from the user that drags a selected timeline recipe of the plurality of timeline recipes from the second portion of the user interface to a targeted grouping of the plurality of groupings of the plurality of content consumption devices in the first portion of the user interface such that the selected timeline recipe sets the adjustable instructions for the rendering of the media production to the targeted grouping;

selecting a media essence file of the plurality of media essence files for the rendering of the media production by matching a respective unique media essence identification of the selected media essence file to the selected timeline recipe, wherein the media essence files each include a sequence of video content and that are each assigned a unique media essence identification;

modifying at least one attribute of a selected media essence file based on a filter selection by the user to modify the selected timeline recipe for the targeted grouping by dragging a graphical user interface element representing a present attribute or filter from the first portion of the user interface into a group among the plurality of groupings in the heat map in the first portion of the user interface; and generating a media content production to be displayed on the respective content consumption devices of the targeted grouping based on selection of a timeline recipe including the modified at least one attribute of the selected media essence.

12. The method of claim 11, wherein the user interface is further configured to:

display, on a fourth portion of the user interface, the selected timeline recipe, wherein the at least one timeline recipe may be modified by the user via manipulation of the plurality of timeline recipes in the second portion of the user interface or the graphical user interface elements from the third portion of the user interface into the plurality of groupings in the first portion of the user interface.

13. The method of claim 11, wherein the plurality of groupings is based on a selected subset of stored classification parameters selected by the user.

14. The method of claim 11, wherein the received viewer profile data comprises at least one of geographical location data of viewers of the content consumption devices, viewership history of the viewers of the content consumption devices, preferences of the viewers of the content consumption devices, software configurations of the content consumption devices, or hardware configurations of the content consumption devices.

15. The method of claim 11, wherein the at least one attribute relates to at least one of selected additional content, an audio level of the selected media essence file, or metadata relating to an object displayed in the media essence file that is to be displayed in the rendering of the media production.

16. The method of claim 11, wherein the media essence file comprises a video clip, an audio clip, or ancillary data to be consumed by content consumption devices.

17. The method of claim 11, wherein the user interface is implemented in a virtual reality environment.

* * * * *